US012722027B2

(12) United States Patent
St. Eve

(10) Patent No.: US 12,722,027 B2
(45) Date of Patent: Sep. 1, 2026

(54) PORTABLE DEPLOYABLE EMERGENCY SAFETY DEVICE

(71) Applicant: Michael Daniel St. Eve, Whistler (CA)

(72) Inventor: Michael Daniel St. Eve, Whistler (CA)

( * ) Notice: Subject to any disclaimer, the term of this patent is extended or adjusted under 35 U.S.C. 154(b) by 468 days.

(21) Appl. No.: 18/332,008

(22) Filed: Jun. 9, 2023

(65) Prior Publication Data

US 2024/0408421 A1 Dec. 12, 2024

(51) Int. Cl.
*A62B 1/22* (2006.01)

(52) U.S. Cl.
CPC .................................... *A62B 1/22* (2013.01)

(58) Field of Classification Search
CPC .......... A62B 1/22; A62B 35/04; A62B 99/00; E04G 21/3261; E04G 21/3271
See application file for complete search history.

(56) References Cited

U.S. PATENT DOCUMENTS 5,150,767 A * 9/1992 Miller .................. A47C 27/081 182/48
7,244,216 B2 * 7/2007 Rastegar .................. A63B 6/02 182/138
7,549,661 B2 * 6/2009 Jackson ................. B62K 27/02 280/491.1
8,348,777 B2 * 1/2013 Ream ....................... A63B 6/02 472/92
12,434,087 B2 * 10/2025 McGehee ................ A63B 6/02

* cited by examiner

*Primary Examiner* — David E Martinez
(74) *Attorney, Agent, or Firm* — Orin Del Vecchio

(57) ABSTRACT

A portable emergency safety device that is configured to be deployed underneath an individual in a precarious situation having a high probability of falling. The invention includes a body wherein the body includes a plurality of inflation chambers defining the shape thereof. The inflation chambers have secured to the top thereof a catch member wherein the catch member completely covers the top area of the body and is configured to receive and retain a falling individual. The catch member is secured to the body utilizing a plurality of keepers. The body moves from a first state which is deflated and stored to a second state utilizing a compressed gas source. One embodiment of the present invention includes at least one terrain adapting inflation chamber that is disposed along a portion of the circumference of the body and is configured to maintain the body in a horizontal position on sloped terrain.

6 Claims, 2 Drawing Sheets

PORTABLE DEPLOYABLE EMERGENCY SAFETY DEVICE

FIELD OF THE INVENTION

The present invention relates generally to safety equipment, more specifically but not by way of limitation, a transportable safety net that is configured to be quickly deployed and inflated wherein the present invention provides a landing area for a falling victim so as to inhibit injury to the falling individual.

BACKGROUND

Recreational skiing and snowboarding is quite popular in North America with millions of individuals participating in the sports every year. There are several types of skiing with the two most common skiing being cross-country skiing and downhill skiing. For the former, a skier can engage in the sport without the need to be transported to a particular location and the skier often traverses across lower valleys and other areas. Regarding the latter type of skiing, downhill skiing, this type of skiing typically takes place at ski resorts and similar facilities wherein the facilities employ ski lifts and gondolas to transport skiers up the mountain to a plurality of locations wherein the skiers subsequently ski down the mountain. While fully enclosed cable cars or gondolas are utilized at some ski resorts, the most common type of ski lift employed is known as a chair lift. The chair lift is typically configured to hold two skiers and is essentially a bench style seat that most often will have a safety bar across the front.

As the chair lift traverses up the mountain, the skiers can sometimes be over one hundred feet above ground. While safety is a priority for ski resort operators, there are occasions when a skier becomes dislodged from the chair lift and may find themselves hanging onto the lift so as to avoid falling to the ground. During these occasions, ski resort operators will deploy several personnel as rapidly as possible and utilize a device such as but not limited to a fireman's net wherein the individuals will hold the net and catch the falling individual so as to inhibit injury thereto. While this can be effective, it can be difficult to deploy several individuals to a specific location in a timely manner. Skiers that are clutching a chair lift to prevent falling many times only have a few minutes prior to their ability to maintain a grasp dissipates.

Accordingly, there is a need for an emergency safety device that can be transported and deployed by a single individual wherein the emergency safety device provides a landing net or similar element configured to catch a falling individual.

SUMMARY OF THE INVENTION

It is the object of the present invention to provide an emergency safety device that is configured to catch a falling individual wherein the present invention includes a body.

Another object of the present invention is to provide a transportable emergency safety device that is configured to be rapidly inflated and provide capture of a falling individual wherein the body is annular in shape and includes a plurality of inflation chambers.

A further object of the present invention is to provide an emergency safety device that is configured to catch a falling individual wherein the body can be configured to include complete inflation chamber as well as partial inflation chambers.

Yet a further object of the present invention is to provide a transportable emergency safety device that is configured to be rapidly inflated and provide capture of a falling individual wherein the partial inflation chambers provide a level body on a sloped terrain.

Still another object of the present invention is to provide an emergency safety device that is configured to catch a falling individual wherein the present invention includes a housing that is configured to provide transportation of the emergency safety device.

An additional object of the present invention is to provide a transportable emergency safety device that is configured to be rapidly inflated and provide capture of a falling individual wherein the body includes a catch member that is disposed within the perimeter of the plurality of inflation chambers.

Yet a further object of the present invention is to provide an emergency safety device that is configured to catch a falling individual wherein the housing further includes an engagement member configured to assist a user transport the emergency safety device.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
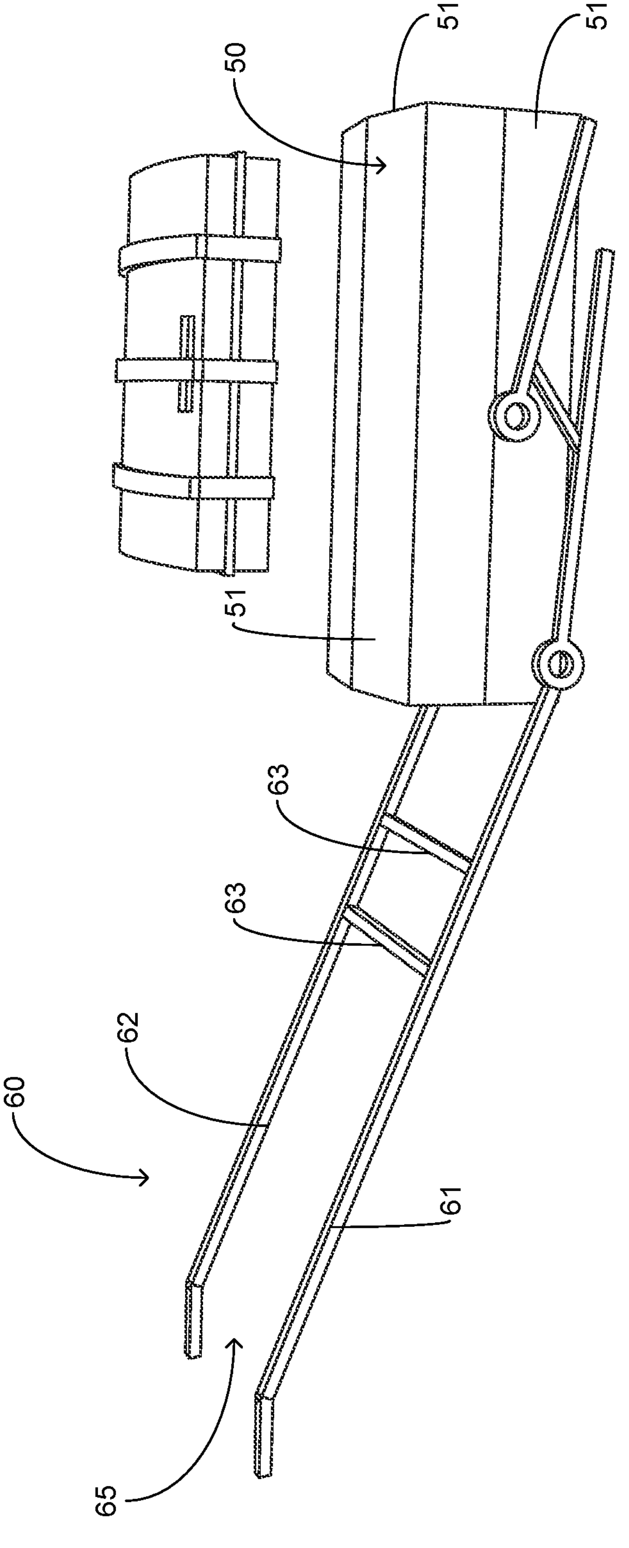
FIG. 1 is a perspective view of the housing of the present invention with body in a deflated position thereabove.

Referring now to the drawings submitted herewith, wherein various elements depicted therein are not necessarily drawn to scale and wherein through the views and figures like elements are referenced with identical reference numerals, there is illustrated an emergency safety device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms “a”, “an” and “the” include the plural reference unless the context clearly dictates otherwise. Thus, for example, a reference to “an element” is a reference to one or more elements and includes equivalents thereof known to those skilled in the art. All conjunctions used are to be understood in the most inclusive sense possible. Thus, the word “or” should be understood as having the definition of a logical “or” rather than that of a logical “exclusive or” unless the context clearly necessitates otherwise. Structures described herein are to be understood also to refer to functional equivalents of such structures. Language that may be construed to express approximation should be so understood unless the context clearly dictates otherwise.

References to “one embodiment”, “an embodiment”, “exemplary embodiments”, and the like may indicate that the embodiment(s) of the invention so described may include a particular feature, structure or characteristic, but not every embodiment necessarily includes the particular feature, structure or characteristic.

Referring in particular to the Figures submitted herewith, the emergency safety device 100 includes a body 10 wherein the body 10 is manufactured from a polyvinyl chloride material or other similar durable material. The body 10 includes a plurality of inflation chambers 15 wherein the inflation chambers 15 are operably coupled to gas source 20 that is configured to provide inflation of the inflation chambers 15. The gas source 20 is a conventional container of compressed gas such as but not limited to compressed carbon dioxide. While a compressed gas source 20 is illustrated and discussed herein, it is contemplated that alternate techniques could be employed to provide inflation of the inflation chambers 15 such as but not limited to large volume fans or pumps. The inflation chambers 15 define the shape of the body 10 and define the perimeter thereof. While an annular shaped body 10 is illustrated herein, it should be understood within the scope of the present invention that the body 10 could be provided in alternate shapes and sizes. Furthermore, it should be understood within the scope of the present invention that the inflation chambers 15 could be sized equivalent to the perimeter edge of the body 10 or be provided as a plurality of smaller sized inflation chambers that comprise the size of the perimeter edge of the body 10. The inflation chambers 15 have a size that is equal to the circumference of the body 10 defining the perimeter edge thereof.

Figure 2:
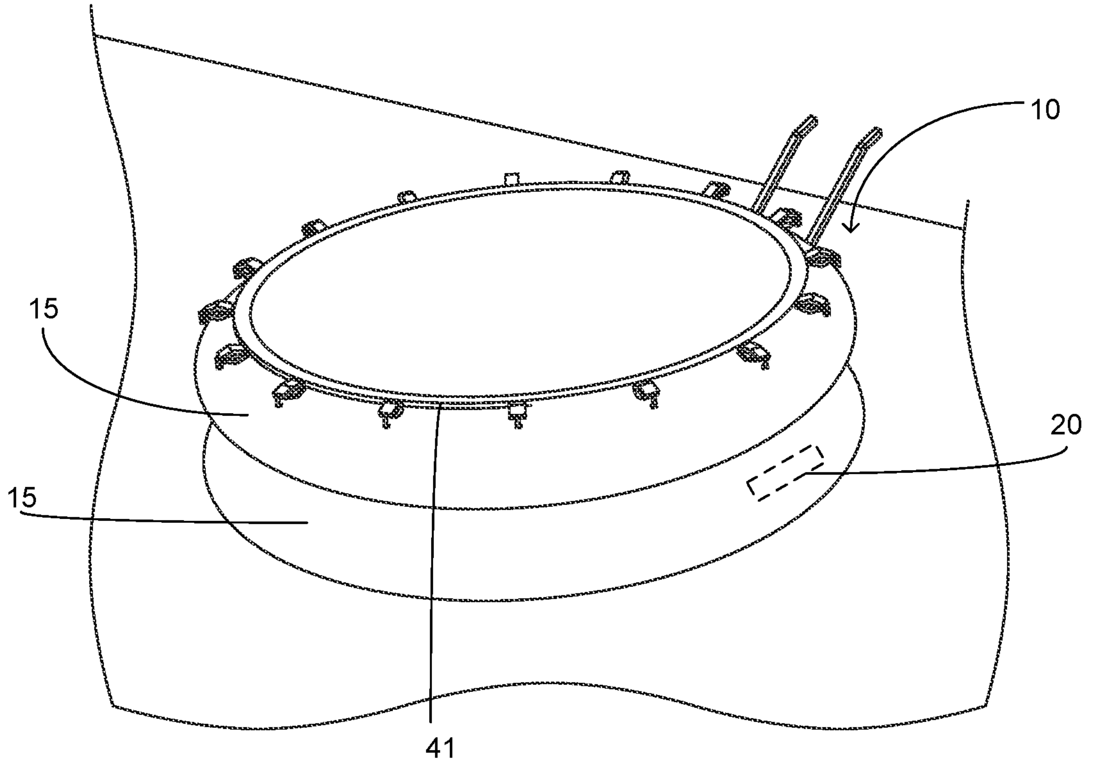
FIG. 2 is a perspective view of the body of the present invention in deployed position.
Figure 3:
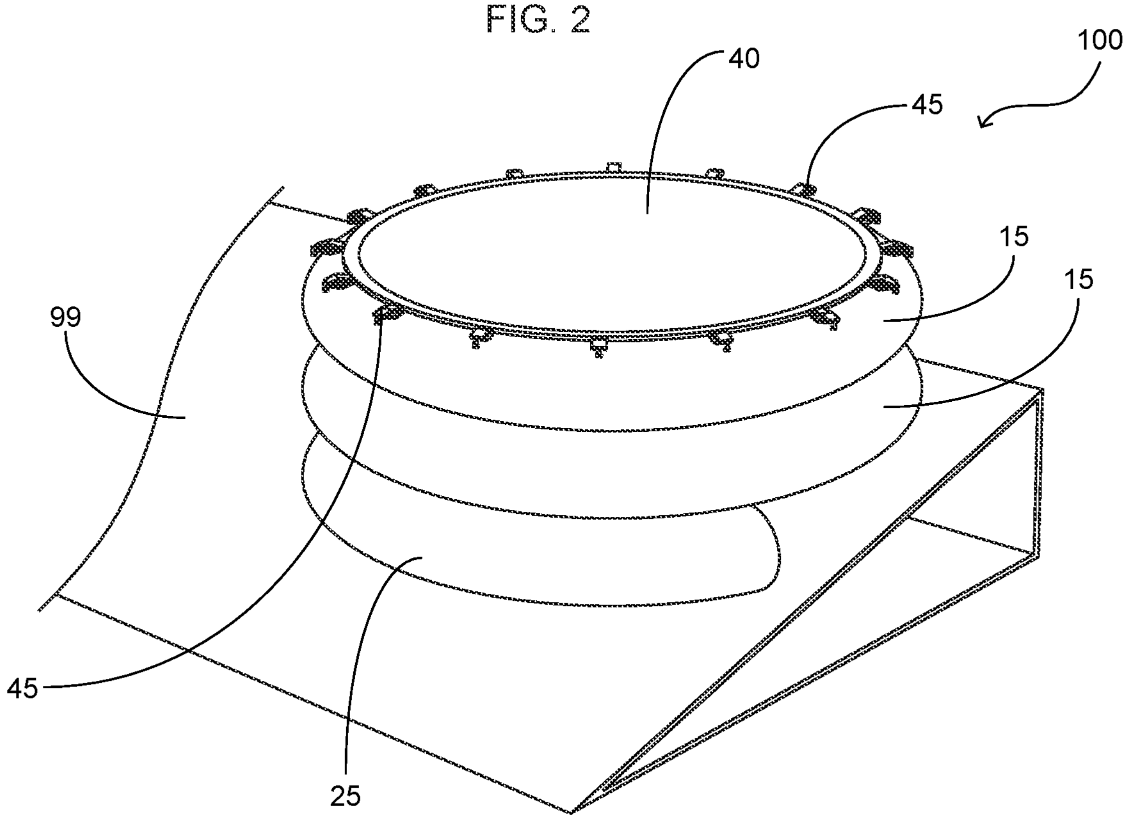
FIG. 3 is a perspective view of a body of the present invention configured with inflation chambers operable to be deployed on a sloped terrain.

As is illustrated herein in FIG. 2 and FIG. 3, the body 10 may be comprised of an alternate quantity of inflation chambers 15. It is contemplated within the scope of the present invention that the body 10 could be comprised of a single inflation chamber 15 or have a plurality of inflation chambers 15 arranged in a vertically stacked configuration as is illustrated in the drawings submitted herewith. It should be understood within the scope of the present invention that the inflation chambers 15 are operably coupled utilizing suitable durable techniques such as but not limited to chemical adhesion. As is illustrated herein in FIG. 3, an embodiment of the emergency safety device 100 can include a terrain adapting inflation chamber 25. The terrain adapting inflation chamber 25 is operable to orient the body 10 in a generally level orientation on sloped terrain 99. Most terrain at ski resorts and other skiing areas typically has a substantially portion thereof that has a slope. To facilitate proper capture of a falling individual, the body 10 is desired to be placed in a generally horizontal and level orientation. The terrain adapting inflation chambers 25 have a size that is less than that of the full circumference of the body 10. As is illustrated herein, the terrain adapting inflation chamber 25 has a size and radius that is generally equivalent to one half of the circumference of the body 10. This provides the necessary stability for the body 10 during capture of a falling individual and further ensures that the body 10 is maintained in a generally horizontal and level orientation. It should be understood within the scope of the present invention that the body 10 may be manufactured with more than one terrain adapting inflation chamber 25.

The emergency safety device 100 includes catch member 40. Catch member 40 is mounted across the top of the body 10 and is secured thereto utilizing a plurality of keepers 45. The catch member 40 is manufactured from nylon or other suitable material and can be provided as a solid material or as a mesh net material. The keepers 45 secured the perimeter edge 41 of the catch member 40 to the body 10. It is contemplated within the scope of the present invention that the catch member 40 could be secured to the keepers 45 utilizing numerous elements and/or techniques. Furthermore, it is contemplated within the scope of the present invention that the keepers 45 could be manufactured in various alternate styles and from different materials. Lastly, it is contemplated within the scope of the present invention that the body 10 could employ alternate quantities of keepers 45 in order to facilitate securing of the catch member 40.

The emergency safety device 100 includes a housing 50 wherein the housing 50 is utilized to store and transport the body 10 in its uninflated state. The housing 50 is manufactured from a suitable rigid material such as but not limited to plastic. The housing 50 includes a plurality of walls 51 defining the shape thereof and an interior volume capable of receiving and retaining the body 10 in its uninflated state. It should be understood within the scope of the present invention that the housing 50 could be provided in alternate sizes and shapes. The housing 50 has operably coupled thereto an engagement member 60. The engagement member 60 includes a first longitudinal support member 61 and a second longitudinal support member 62 operably coupled to opposing sides of the housing 50 and having a void 65 therebetween. Void 65 is of suitable width to permit an individual to be disposed therein so as to grasp the first longitudinal support member 61 and the second longitudinal support member 62 in order to facilitate movement of the housing 50 across a terrain. The engagement member 60 further includes lateral support members 63 that are mounted intermediate the first longitudinal support member 61 and the second longitudinal support member 62 being perpendicular thereto. Lateral support members 63 provide structural support for the engagement member 60 and it should be understood within the scope of the present invention that the engagement member 60 could be provided with alternate quantities of lateral support members 63. While a specific embodiment of the engagement member 60 has been illustrated and discussed herein, it is contemplated within the scope of the present invention that alternate embodiments of the engagement member 60 could be deployed and facilitate the desired objective as discussed herein. Furthermore, while not particularly illustrated herein, it is contemplated within the scope of the present invention that the housing 50 could be equipped with ski members or other similar element to assist in traversal across a snow covered terrain. Additionally, the housing 50 could be equipped with wheels or similar element to assist in traversal across alternate terrains and/or conditions. While a chair lift and ski resort environment has been discussed herein as an exemplary use of the present invention, it should be understood within the scope of the present invention that the present invention could be deployed in alternate environments to assist individuals in a precarious situation having a high probability of falling.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A portable emergency safety device configured to be deployed underneath an individual in a precarious situation having a high probability of falling wherein the portable emergency safety device comprises:

a body, said body having at least one inflation chamber, said at least one inflation chamber defining a size and shape of the body, said body having a first state and a second state, said at least one inflation chamber being operably coupled to an air source, said air source operable to transition said body from the first state to the second state wherein in said second state said at least one inflation chamber is inflated;

a catch member, said catch member being disposed across a top area of said body, said catch member configured to receive and retain a falling individual, said catch member being secured to said body proximate a perimeter edge thereof;

a housing, said housing having a plurality of walls forming an interior volume, said housing configured to receive and store the body in said first state, said housing configured to facilitate transportation of the portable emergency safety device; and at least one terrain adapting inflation chamber, said at least one terrain adapting inflation chamber being secured to a bottom area of said at least one inflation chamber and said at least one terrain adapting inflation chamber extending around a perimeter edge of the body a distance that is less than the entire circumference of the body.

2. The portable emergency safety device configured to be deployed underneath an individual in a precarious situation having a high probability of falling as recited in claim 1, and further including an engagement member, said engagement member being secured to said housing, said engagement member configured to be utilized by an individual to traverse said housing across a terrain.

3. The portable emergency safety device configured to be deployed underneath an individual in a precarious situation having a high probability of falling as recited in claim 2, wherein the at least one inflation chamber extends around an entire circumference of the body.

4. A portable emergency safety device configured to be deployed underneath an individual in a precarious situation having a high probability of falling wherein the portable emergency safety device comprises:

a body, said body having a plurality of inflation chambers, said plurality of inflation chambers being arranged in a vertically stacked orientation, said plurality of inflation chambers defining a size and shape of the body, said body having a first state and a second state, said plurality of inflation chambers being operably coupled to an air source, said air source operable to transition said body from the first state to the second state wherein in said second state said plurality of inflation chambers are inflated;

a catch member, said catch member being disposed across a top area of said body, said catch member being secured to said body utilizing a plurality of keepers secured to the top area of said body, said catch member configured to receive and retain a falling individual, said plurality of keepers securing the catch member being secured to said top area of said body proximate a perimeter edge thereof;

a housing, said housing having a plurality of walls forming an interior volume, said housing configured to receive and store the body in said first state, said housing configured to facilitate transportation of the portable emergency safety device; and at least one terrain adapting inflation chamber, said at least one terrain adapting inflation chamber being secured to a bottom area of said at least one inflation chamber and said at least one terrain adapting inflation chamber extending around a perimeter edge of the body a distance that is less than the entire circumference of the body.

5. The portable emergency safety device configured to be deployed underneath an individual in a precarious situation having a high probability of falling as recited in claim 4, and further including an engagement member, said engagement member being secured to said housing, said engagement member configured to be utilized by an individual to traverse said housing across a terrain.

6. The portable emergency safety device configured to be deployed underneath an individual in a precarious situation having a high probability of falling as recited in claim 5, wherein said engagement member includes a first longitudinal support member and a second longitudinal support member, wherein the first longitudinal support member and the second longitudinal support member have ends secured to said housing and extend outward therefrom, said first longitudinal support member and said second longitudinal support member having a void therebetween of suitable size to accommodate a human being therein.

* * * * *